United States Patent
Guyot et al.

(10) Patent No.: US 6,587,157 B1
(45) Date of Patent: Jul. 1, 2003

(54) STORING DIGITAL VIDEO BROADCAST SIGNALS

(75) Inventors: Jean Marc Guyot, Paris (FR); Regis Lauret, Sonchamp (FR)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/346,439

(22) Filed: Jul. 1, 1999

(51) Int. Cl.[7] .................................................. H04N 9/64
(52) U.S. Cl. ........................ 348/714; 348/715; 348/716; 375/326
(58) Field of Search ................................. 348/714, 726, 348/715, 716, 717, 718; 375/232, 326; H04N 9/64

(56) References Cited

U.S. PATENT DOCUMENTS 6,098,161 A * 8/2000 Kim ........................... 375/232
6,320,627 B1 * 11/2001 Scott et al. .................. 348/726
6,320,917 B1 * 11/2001 Stott et al. ................... 375/326
6,369,857 B1 * 4/2002 Balaban et al. .............. 348/555

* cited by examiner

Primary Examiner—John Miller
Assistant Examiner—Linus H. Lo
(74) Attorney, Agent, or Firm—Christopher P. Maiorana, P.C.

(57) ABSTRACT

In order to reduce memory requirements in a chip for demodulating digital video broadcast signals, symbol data values stored for a channel equalisation process have their scattered pilots removed, to achieve a 9% reduction in memory space required. This is achieved by providing a write pointer and a read pointer, the write pointer being arranged to exclude carriers carrying scattered pilots, and the read pointer being arranged to read the stored symbol data, but to add nominal data values at positions of excluded scattered pilots.

21 Claims, 5 Drawing Sheets

CELL ERASURE WHEN PERFORMING IN-PLACE METHOD

NORMAL DELAY LINE IMPLEMENTATION

CHANNEL EQUALIZER STRUCTURE

SCATTERED PILOT'S POSITION FOR VARIOUS OFDM SYMBOL NUMBERS

INPUT TO THE RAM

OUTPUT TO THE RAM

RAM SP RE-GENERATION

CELL ERASURE WHEN PERFORMING IN-PLACE METHOD

STORING DIGITAL VIDEO BROADCAST SIGNALS

This invention relates to method and apparatus for storage of signal samples, particularly though not exclusively in the demodulation of digital video broadcast (DVB) signals.

There are currently two major types of DVB, namely, terrestrial broadcasting and satellite/cable broadcasting. The invention is particularly, though not exclusively concerned with terrestrial broadcasting, which has special problems, particularly in communication channel impairment, arising from adjacent television channels, multipath, and co-channel interference, for example. A type of transmission which has been developed to meet these problems is known as Coded Orthogonal Frequency Division Multiplexing (COFDM)—see for example "Explaining Some of the Magic of COFDM" Stott, J. H.—Proceedings of 20th International Television Symposium, Montreux, June 1997. In COFDM, transmitted data is transmitted over a large number of carrier frequencies (1705 or 6817 for DVB), spaced (by the inverse of the active symbol period) so as to be orthogonal with each other; the data is convolutionally coded, to enable soft-decision (Viterbi) decoding. Metrics for COFDM include Channel State Information (CSI) which represents the degree of confidence in each carrier for reliably transmitting data.

Modulation and Demodulation of the carriers may be carried out by a Fast Fourier Transform (FFT) algorithm performing Discrete Fourier Transform operations. Naturally, various practical problems arise in demodulation in a receiver, firstly in down-converting the transmitted signal in a tuner to a frequency at which demodulation can be carried out, and secondly by accurately demodulating the data from a large number of carriers in a demodulator which is not overly complex or expensive.

In the receiver, frequency offsets may appear after the tuner down-conversation due to oscillator tolerance. Such frequency offset is lethal for signal recovery and frequency has therefore to be tracked by Automatic Frequency Control (AFC). In addition, oscillator phase noise introduces a so-called Common Phase Error (CPE) term, which is a phase offset all carriers bear, and that varies randomly from symbol to symbol. This effect has also to be compensated. Finally, the channel response may not be flat, due to echoes, interferers, and a Channel Equaliser is required to correct for such channel imperfections.

An important consideration in designing a demodulator for incorporation in an integrated circuit chip is reducing the requirements for memory. Bearing in mind the chip may only contain about 1 M Bit of memory, and that signal values for up to about 7000 carrier frequencies may be processed in the chip, this requires tight control over the use of available memory. Certain operations such as Fourier transformation and symbol interleaving require fixed amounts of memory (about 50% of the total). However, other operations such as timing synchronisation, common phase error (CPE) correction, and Channel Equalisation (CE) require some memory but the amount of memory is not fixed.

In our copending application British patent no. 9808992.3, there is claimed an arrangement for reducing memory requirements, including:
transform means for analysing the broadcast signal to provide a series of symbol values for each of the multiplicity of carrier frequencies,
automatic frequency control means for controlling the frequency of said series of signal values in dependence on a common phase error signal from said series of symbol values,
first and second delay means coupled in series to receive said series of symbol values from said transform means, and means for deriving from symbol values in the first and second delay means a common phase error signal,
first and second common phase error correction (CPE) means for receiving said common phase error signal, for correcting said symbol values from said transform means, the output of the first delay means being applied to the first CPE means and the output of the second delay means being applied to said second CPE means,
channel equalisation means for compensating for communication channel impairments for receiving directly the phase error corrected signals from said first CPE means, and third and fourth delay means connected in series and connected to receive the output from said second CPE means and applying delayed versions of the same to the channel equalisation means.

Common phase error requires at least one symbol delay (for each carrier) and channel equalisation may use three symbols delay (for each carrier). However, this arrangement permits the channel equalisation to use only two symbols delay. Whilst this represents a considerable saving in memory, further savings would be desirable.

SUMMARY OF THE INVENTION

The present invention is based on the recognition that "scattered pilots", which form a constituent part of the DVB signal, need not be stored in the channel equalisation step.

Scattered pilots are precisely defined in ETSI standard ETS 300744, para. 4.5.3 and FIG. 11. Put simply, for each of 68 symbols, every 12th carrier (1705 carriers in 2K mode, 6817 carriers in 8K mode) is a scattered pilot signal of boosted power. In successive symbols, the pilot signal positions are incremented by 3 (so that e.g. for symbol S, a pilot is at position k=12, but for symbol S+1, the pilot is at k=15). Scattered pilots are used inter alia for determining the channel response function for channel equalisation. It is not therefore necessary to store them as symbol data. However, because of the rotation of the pilot positions, the pilots cannot simply be deleted from the incoming data without creating confusion and possible loss of data.

Accordingly, the present invention provides in a first aspect, a method of storing symbol data values in a digital video broadcast signal, each symbol comprising a multiplicity of symbol data values including scattered pilot signals, comprising:
providing a write pointer means for writing successive data values for each symbol in successive memory locations, but excluding scattered pilot values, whereby to store symbol data values for at least one symbol,
and providing a read pointer means for reading successive stored data values from successive memory locations, but adding nominal data values at positions of excluded scattered pilots.

In a further aspect, the invention provides apparatus for storing symbol data values in a digital video broadcast signal, each symbol comprising a multiplicity of symbol data values including scattered pilot signals, comprising:
a write pointer means for writing successive data values for each symbol in successive memory locations, but excluding scattered pilot values, for storing symbol data values for at least one symbol,
and a read pointer means for reading successive stored data values from successive memory locations, but adding nominal data values at positions of excluded scatter pilots.

In accordance with the invention, the provision of separate read and write pointer permits the exclusion of scattered pilot signals whilst resolving the problem of maintaining the data values at their correct positions when read from the memory for further processing. A saving of 9% in memory requirements may therefore be achieved, which is a significant saving.

Whilst any number of symbols may be stored, two symbols are the preferred number. The memory locations are preferably stored in a matrix of rows and columns, with a first column storing the first symbol, the data values being entered from a low address to a high address, and any remainder of the first column together with a second column storing the second symbol, with data values being entered from the high address to the low address. In this way, the write pointer continuously circulates around the memory locations, to store the latest two symbols. The read pointer is preferably positioned a predetermined number of memory locations in advance of the write pointer, preferably a minimum of two locations. Thus, the read pointer circulates just in advance of the write pointer, reading stored data just before it is overwritten with new data. The spacing of the pointers permits some variation in their relative position while scattered pilots are excluded, and nominal data subsequently inserted. As preferred, in the initial position of the portions, two memory locations are maintained empty so that writing takes place at the initial position of the read pointer.

BRIEF DESCRIPTION OF THE DRAWINGS

A preferred embodiment of the invention will now be described with reference to the accompanying drawings wherein.

DESCRIPTION OF THE PREFERRED EMBODIMENT

In COFDM, demodulation involves sequentially executing three different algorithms, completely independently of one another. Thus, after acquiring AFC lock, CPE is corrected, and then CE takes place.

It is important to note that the CPE correction has to be done prior to the CE, as the rapid variations introduced by the CPE term cannot be handled in the CE.

The initial algorithm requires the following memories:
1. AFC: To perform the AFC lock, the second phase difference between carriers of same index belonging to two adjacent OFDM symbol are required. Therefore, two 8K Real memories are required.
2. CPE: Because the CPE value is known after the full OFDM symbol arrived, one full OFDM symbol delay is required. We therefore need one 8K complex memory.
3. CE: Because of a linear temporal interpolation in the algorithm, three symbol delays are required. We therefore need three 8K complex memories.

Figure 1:
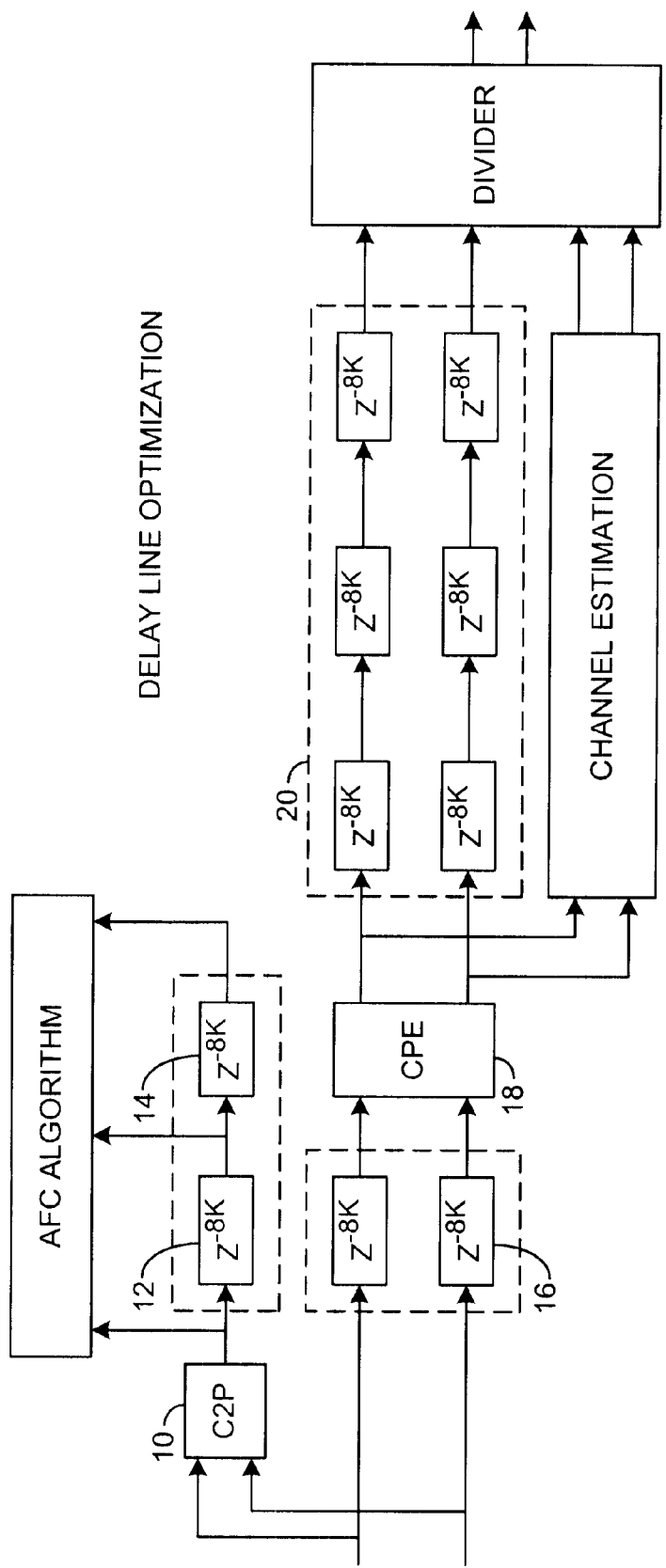
FIG. 1 is a schematic block diagram of one means of implementing automatic frequency control (AFC), common phase error correction (CPE), and channel equalisation (CE) for DVB signals.

As shown in FIG. 1, the complex base-band representation of the OFDM signal is converted from complex to phase at 10 and enters two delay units 12, 14 each of them being one OFDM symbol wide. The phases of symbols n,n−1, and n−2 are used by the AFC to estimate the frequency offset as well as the common phase error. After a full symbol has arrived, the AFC carries the CPE value. Therefore, a complex OFDM symbol delay 16 is necessary for the CPE block 18 to correct re-phase the input stream with the correct value.

After the CPE is carried out, the complex signal enters the channel equaliser unit 20 in charge of estimating the channel response. For the same reason as before, three OFDM symbols latency is required to rephase the input stream with the channel estimate.

As a result, such straight forward implementation requires ten 8K real memories.

Figure 2:
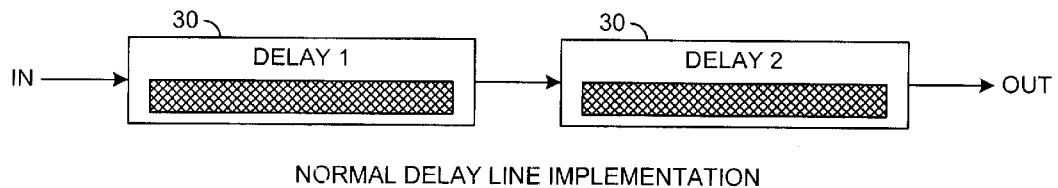
FIG. 2 is a block diagram of a known implementation of a delay line for use in a revised structure of channel equalisation, shown in block diagram form in FIG. 3, according to our copending application British patent application no. 9808882.3.
Figure 3:
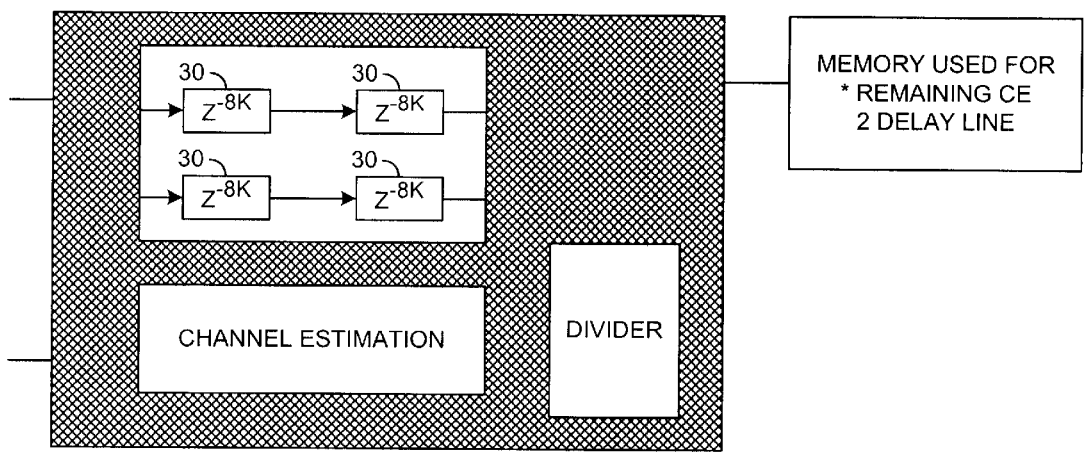

British application no. 9808992.3 aimed at reducing the overall memory size by some partitioning and sharing of the different memories, requiring 2 complex memories located in the channel equaliser (CE). A usual implementation of such delay units 30 would be to store all the 6817 Active Pilots (in 8K) and delay them by 2 OFDM symbols as shown in FIG. 2.

This would then require 2×6817×2×10 bits of memory (2 complex memories of 10 bits for real/imaginary parts). This is still a large amount of memory.

Looking more closely at OFDM peculiarities lead to an optimisation in accordance with this invention. The rationale behind the delay line is to re-phase the input signal with the channel response calculated by the CE in order to divide it with the correct estimation. In fact, the channel estimation uses the so-called scattered pilots (SP) (1 carrier every 12) to estimate a snapshot of the channel response. But these SP are of no interest for the delay line. Blocks after the CE are only interested in data, excluding SP, CP and TPS pilots.

In accordance with the invention, scattered pilots are removed from the delay line, by not storing them. Because there are 568 SP among the 6817 carriers (in 8K mode), this reduction yields a decrease of more than 9% of the total memory.

Figure 4:
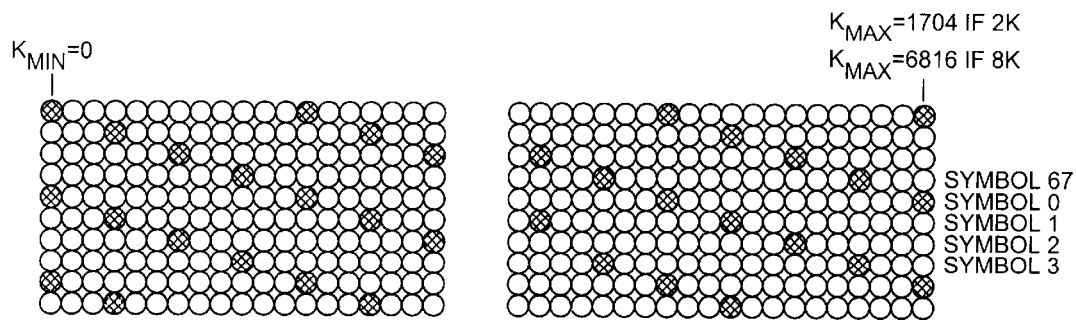
FIG. 4 is a reproduction of FIG. 11 of the ESTI standard for scattered pilots, showing their position in the symbol structure.

However, the SP are not always located at the same position from symbol to symbol, and that is what makes the implementation a little harder. FIG. 4 shows the SP positions as a function of the OFDM symbol number, as defined in the ETSI specification, thus: for the symbol of index 1 (ranging from 0 to 67) carriers for which index k belongs to the subset ($k=Kmin+3\times(1 \mod 4)+12p/p$ integer, $p \geq 0$, $k E[K_{min};K_{max}]$) are scattered pilots.

Figure 5:
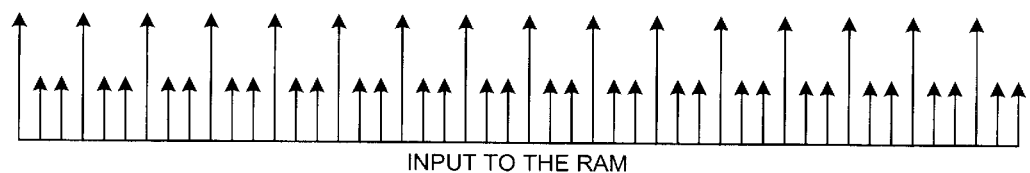
FIG. 5 is a schematic diagram of the principle of removing scattered pilots.
Figure 5:
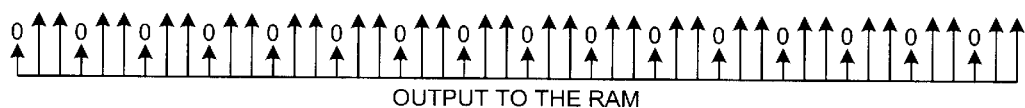

Firstly, it is important that this optimisation does not alter the OFDM carrier framing. Therefore, the output of this optimised RAM must regenerate the missing SP- with a nominal data value 0- at their theoretical positions, as shown in FIG. 5.

Secondly, since SP are not always located at the same positions from symbol to symbol, a normal in-place algorithm (e.g. reading at a given address and storing the same value at the same place) cannot be used.

SP are located at indexes $k_{SP}$ that satisfy the following criteria: $k_{SP}=12p+S_{NB}$ where p is an integer and $S_{NB}$ is the symbol number (modulo 4).

Therefore, for symbol number $S_{NB}$, carriers shall not be stored if the carrier index k meets the previous criteria, as it would then be a SP.

When the next symbol arrives, we want to output the previous one, and store the new symbol $S_{NB}+1$. Thus, each time the carrier index k equals $k=12p+(S_{NB}+1)$ mod 4 nothing should be stored. Besides, each time the carrier index k equals $k=12p+S_{NB}$, then nothing should be read as at this location was a SP that has not been stored.

Therefore, one can see that the Read and Write pointers cannot be the same.

Figure 6:
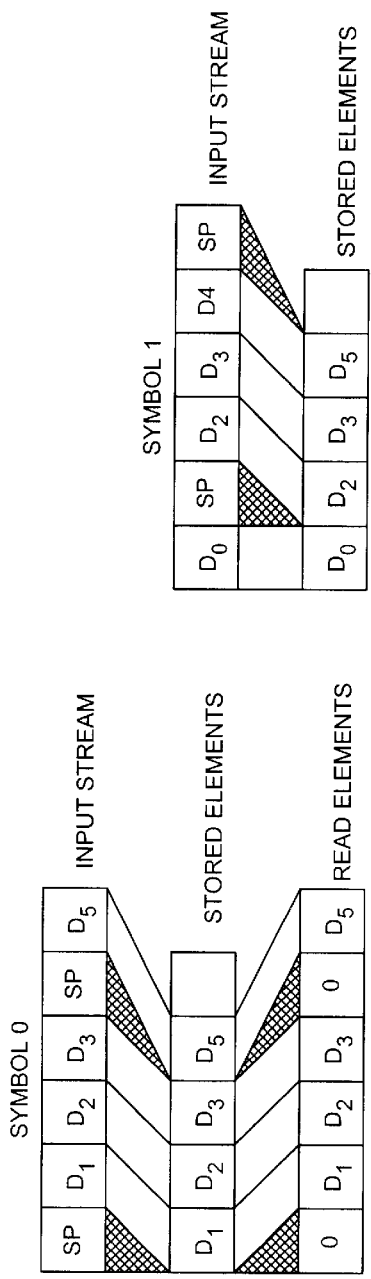
FIG. 6 is a diagram of an incorrect method of removing scattered pilots.

FIG. 6 shows that in the case of a delay of 1 OFDM symbol, the in-place algorithm does not work at all. It erases data. Indeed, when symbol 1 starts, the data on carrier 0 is to be stored at address 0 of the memory, but the data contained in this memory location is the data that was on carrier 1 during the previous symbol.

Therefore, the invention provides a mechanism to allow the removal of all SP without the cost of losing data. In order to perform such task, two pointers are used, a read pointer, $P_r$ and a write pointer $P_w$. Those two points have a fixed offset at the beginning so that the write pointer never catches the read pointer. Indeed, as the scattered pilot positions vary with time, it may happen that one needs to store a carrier at an index where nothing was stored at the previous index of the preceding symbol. If such a situation appears, it means that the content of the RAM at that address is the next carrier. So, writing at the same address that one reads would imply loss of data. Moreover, it may happen that one needs to read a scattered pilot that was not stored. We then need to deliberately output a value, say 0 to regenerate the same overall carrier organisation, but the read pointer does not move.

Because reading and writing may not be performed at every carrier, and because the reading scattered pilot positions and writing SP positions are not identical (as they belong to two different symbol numbers), there is a need for some spare cells in the memory to deal with the jitter of both reading and writing pointers. As there are the same SP in each OFDM symbol, the reading and writing rates are identical in average the only difference is when such readings occurs. Enough spare cells are placed so that the write pointer never catches the read pointer so that no data is lost.

Figure 7:
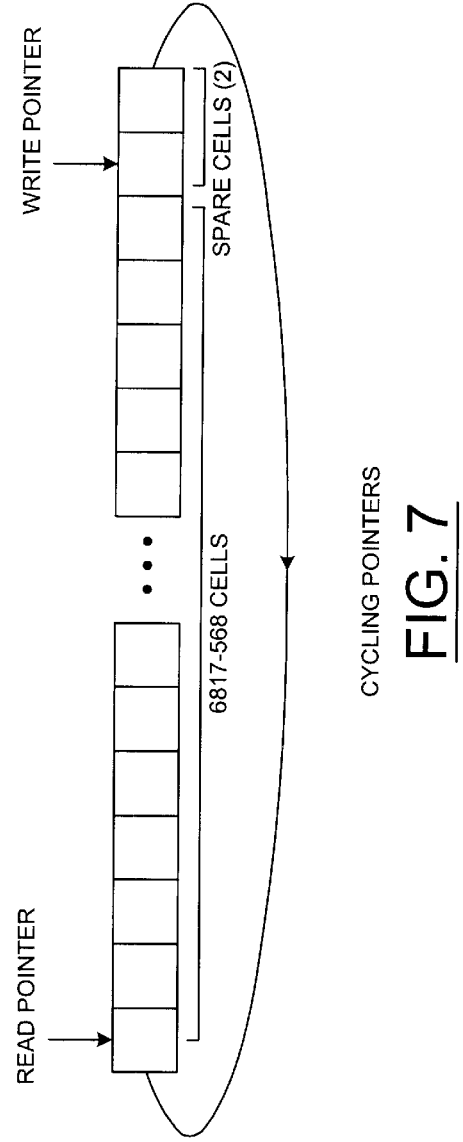
FIG. 7 is a schematic view of a means of reading and writing symbol data to memory whilst excluding scattered pilots, in accordance with a preferred embodiment of the invention.

To generate a 1 OFDM symbol delay, two additional cells are required. The following sequence is then necessary, indicated in FIG. 7.

After reset, the write pointer shape be placed at address 0. Then pilots that are not scattered pilots shall be stored in the memory, and the pointer shall be increased by 1. When a scattered pilot is detected, no writing shall be made, and the write pointer shall remain constant.

At the arrival of the second symbol, the read pointer shall be placed at address 0, and the write pointer to the next available cell.

Address shall be understood as modulo the RAM size. In other terms, when an address pointer is equal to the maximum address, it should be reset to 0.

The read process is similar to the write process. A value is read from the memory if the value present is not a scattered pilot, whereas the process is stalled if a scattered pilot is present. When a scattered pilot should be output, a zero is inserted instead in the output data stream.

After the second symbol, R/W pointers shall not be reset anymore.

Figure 8:
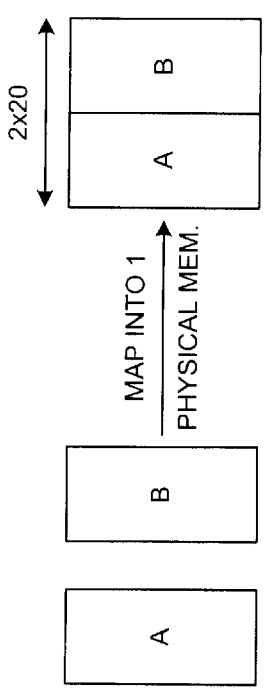
FIG. 8 is a schematic diagram of a preferred method of organising physical memory for storing to symbols in accordance with the invention.

As a two OFDM symbol delay is required, the hardware can be optimised by locating the two logical memories into one physical memory, as shown in FIG. 8.

This architecture leads to a smaller physical memory size. On top of that values do not have to be moved from the first delay line to the second delay line as shown in FIG. 2. Indeed, by moving the circular pointer in "A" part of the memory, then in the "B" part of the memory, we can emulate a two OFDM symbol delay, by reading and writing at positions that are roughly two OFDM symbol apart in time.

After reset, the write pointer, $P_w$ shall be placed at address 0, of part A of the memory (bits from 0 to 19). $P_w=(A,0)$. Then pilots that are not scattered pilots are stored in the memory, and the pointer is increased by 1. When a scattered pilot is detected, no writing shall be made, and the write pointer shall remain constant. At the end of the first symbol, the write pointer should be at position $P_w=(A,6249)$.

At the arrival of the second symbol, $P_w$ keeps its actual place, and the process continues as before. When the pointer reaches the last address line 6250, its reset to address 0, but this time writing will occur in the right part of the address, in the area B, corresponding to bits 20 to 39. At the end of the second symbol, the write pointer is at position $P_w=(B, 6247)$.

When the third symbol arrives, the write pointer continues its cyclic movement. Therefore, when $P_w=(B,6250)$ is reset to $P_w=(A,0)$, and so on. On the other hand, the read pointer $P_r$ starts reading from position $(A,0)$, and follows the same principle as the write pointer. The read process is similar to the write process. A value is read from the memory if the value present is not a scattered pilot, whereas the process is stalled if a scattered pilot is present. When a scattered pilot should be output, a zero is inserted instead in the output data stream.

Because at the beginning of symbol 3 the read pointer and write pointer are separated by roughly two OFDM symbols a two OFDM symbol delay is provided between writing and reading.

Figure 9:
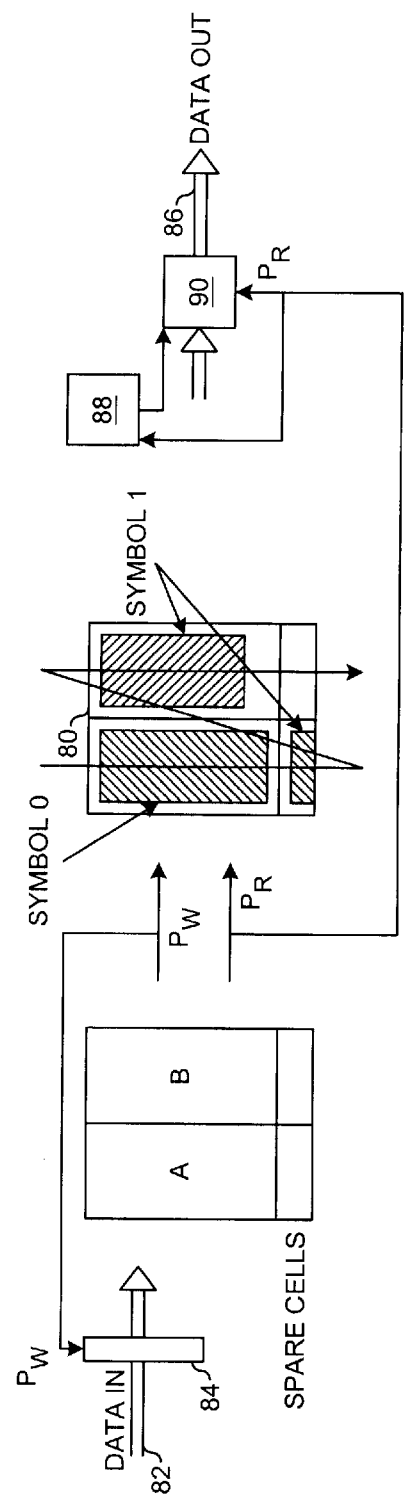
FIG. 9 is a more detailed schematic block diagram of the preferred arrangement in accordance with the invention for storing symbol data whilst excluding scattered pilot signals.

As indicated schematically in FIG. 9, data is written in to memory 80 on Data_In line 82 under control of write pointer $P_w$. Pointer $P_w$ is arranged to exclude scattered pilot signals, as indicated schematically by gate 84 under control of pointer $P_w$.

Data is read out of memory 80 on Data_Out line 86 under control of read pointer $P_r$. A data insert unit 88 provides a nominal data value of 0 to a multiplexer 90 in the Data_Out line under control of read Pointer $P_r$. Proper sequencing of gate 84 and multiplexer 90 takes place under control of the read and write pointers, in accordance with the scattered pilot algorithm indicated above.

What is claimed is:

1. A method of storing symbol data values in a digital video broadcast signal, each symbol comprising a multiplicity of symbol data values including scattered pilot signals, comprising the steps of:

(A) writing successive data values for each symbol in successive memory locations, but excluding scattered pilot values, wherein step (A) stores symbol data values for at least one symbol; and (B) reading successive stored data values from successive memory locations, but adding nominal data values at positions of excluded scattered pilots, wherein a read pointer and a write pointer are arranged to be incremented along a first column from an initial position to a final position.

2. The method according to claim 1, wherein scattered pilots are excluded by excluding values of carriers (ksp) at positions $$k_{sp}=12p+S_{NB}$$

where p is an integer and $S_{NB}$ is the symbol number (modulo 4).

3. The method according to claim 1, wherein data values of 0 are added at the scattered pilot positions when data is read from the memory.

4. The method according to claim 1, including storing data values for two successive symbols.

5. The method according to claim 1, wherein the write pointer and the read pointer are arranged to circulate around the memory locations, with the read pointer a predetermined number of locations ahead of the write pointer.

6. The method according to claim 5, wherein the read pointer is located two memory locations in front of the write pointer.

7. The method according to claim 6, wherein (i) the memory locations are arranged in a matrix of rows and columns, (ii) one data symbol stored in one column comprises a first part of each row, (iii) at least part of a second data symbol stored in a second column comprises a second part of each row, and (iv) each of said first and said second row parts comprises a memory location.

8. The method according to claim 1, wherein the method is employed in a channel equalization step.

9. An apparatus for storing symbol data values in a digital video broadcast signal, each symbol comprising a multiplicity of symbol data values including scattered pilot signals, comprising:
    a write pointer (i) configured to write successive data values for each symbol in successive memory locations, but excluding scattered pilot values, and (ii) configured to store symbol data values for at least one symbol; and
    a read pointer configured to read successive stored data values from successive memory locations, but adding nominal data values at positions of excluded scattered pilots, wherein the read pointer and the write pointer are arranged to be incremented along a first column from an initial position to a final position.

10. The apparatus according to claim 9, further configured to exclude scattered pilots by excluding values of carriers ($k_{sp}$) at positions $k_{sp}=12p+S_{NB}$
    where p is an integer and $S_{NB}$, is the symbol number (modulo 4).

11. The apparatus according to claim 9, further configured to add data values of 0 at the scattered pilot positions when data is read from memory.

12. The apparatus according to claim 9, wherein the memory locations are sufficient to store two successive data symbols.

13. The apparatus according to claim 12, wherein the memory locations are arranged in a matrix of rows and columns, the first column comprising a first part of each row configured to store a first symbol, and a second column comprising a second part of each row configured to store at least part of a second symbol, each such row part comprising a memory location.

14. The apparatus according to claim 13, wherein the read pointer and the write pointer are arranged (i) to be incremented along the first column from the initial position to the final position, (ii) then to be reset to an initial position of the second column and (iii) then to increment to a final position of the second column to be reset to the initial position of the first column.

15. The apparatus according to claim 9, wherein the write pointer and the read pointer are arranged to circulate around the memory locations, with the read pointer a predetermined number of locations ahead of the write pointer.

16. The apparatus according to claim 15, wherein the read pointer is located two memory locations in front of the write pointer.

17. An apparatus for storing symbol data values in a digital video broadcast signal comprising:
    one or more memory locations arranged in a matrix of rows and columns, a first column comprising a first part of each row for storing a first symbol, and a second column comprising a second part of each row for storing at least part of a second symbol, wherein (i) each row comprises a memory location and (ii) each symbol comprises a plurality of symbol data values including scattered pilot signals;
    a write pointer configured to (i) write successive data values for each symbol in successive memory locations sufficient to store two successive data symbols, but excluding scattered pilot values, and (ii) store symbol data values for at least one symbol; and
    a read pointer configured to read successive stored data values from successive memory locations, but adding nominal data values at positions of excluded scattered pilots, wherein the read pointer and the write pointer are arranged (i) to be incremented along the first column from an initial position to a final position, (ii) then to be reset to an initial position of the second column and (iii) then to increment to a final position of the second column to be reset to the initial position of the first column.

18. The apparatus according to claim 17, further configured to exclude scattered pilots by excluding values of carriers (ksp) at positions $$k_{sp}=12p+S_{NB}$$

where p is an integer and $S_{NB}$ is the symbol number (modulo 4).

19. The apparatus according to claim 17, further configured to add data values of 0 at the scattered pilot positions when data is read from memory.

20. The apparatus according to claim 17, wherein the write pointer and the read pointer and arranged to circulate around the memory locations, with the read pointer a predetermined number of locations ahead of the write pointer.

21. The apparatus according to claim 20, wherein the read pointer is located two memory locations in front of the write pointer.

* * * * *